United States Patent [19]

Jonas

[11] 4,012,533
[45] Mar. 15, 1977

[54] MULTIPURPOSE WHIPPED DESSERT AND METHOD OF MANUFACTURING

[75] Inventor: John J. Jonas, Winnetka, Ill.

[73] Assignee: Kraft, Inc., Glenview, Ill.

[22] Filed: Nov. 17, 1975

[21] Appl. No.: 632,858

[30] Foreign Application Priority Data

Nov. 20, 1974 United Kingdom ............ 50212/74

[52] U.S. Cl. ............................................. 426/565
[51] Int. Cl.² ...................... A23G 9/02; A23G 9/04
[58] Field of Search .......... 426/565, 566, 567, 582, 426/101, 570

[56] References Cited

UNITED STATES PATENTS

| | | | |
|---|---|---|---|
| 3,310,406 | 3/1967 | Webster | 426/582 |
| 3,397,995 | 8/1968 | Elenbogen | 426/582 |
| 3,433,651 | 3/1969 | Diamond | 426/565 |
| 3,702,768 | 11/1972 | Finucane et al. | 426/566 |
| 3,836,683 | 9/1974 | Hoos | 426/582 |

Primary Examiner—Jeanette M. Hunter
Attorney, Agent, or Firm—Fitch, Even, Tabin & Luedeka

[57] ABSTRACT

Multipurpose whipped dessert which may be consumed in the frozen state as an ice cream type product, or alternately in the thawed state as a whipped topping, and the method of manufacturing same.

18 Claims, No Drawings

MULTIPURPOSE WHIPPED DESSERT AND METHOD OF MANUFACTURING

This invention relates generally to edible whipped desserts and to the method of manufacturing such products, and more particularly to multipurpose edible whipped desserts which may be consumed in the frozen state as an ice cream-type dessert, and which may alternately be consumed in the thawed state as a whipped topping; to emulsions from which the dessert products may be formed; and to the method of manufacturing such multipurpose edible whipped desserts.

Two of the most commonly eaten edible whipped desserts are ice cream and whipped topping. The term ice cream is intended to include ice cream, ice milk, sherbet, and the like, which are consumed in the frozen state. Ice cream products have definite organoleptic properties, i.e., mouth feel, melt down, and the like which must be met in order to achieve consumer acceptance. Ice cream-type products are manufactured in accordance with well-known procedures in which an aqueous mix of ingredients is pasteurized, homogenized, and whipped under freezing conditions, typically 21° to 23° F., to provide an aerated partially frozen mass which is filled into suitable containers and further frozen, i.e., hardened, under controlled conditions. Care must be maintained in the storage and distribution of ice cream-type products in order to be certain that they are maintained at the proper temperature, for example, between −10° to −20° F., in order to prevent undesired growth of water and/or sugar crystals which result in an undesirable property generally referred to as sandiness. Because of the particular temperature requirements for storage of ice cream-type products, they cannot be stored, distributed, and/or sold at temperatures commonly associated with frozen foods (0° to 10° F.), and therefore require a separate distribution and delivery system as well as a separate freezer at the point of sale, all of which is generally undesirable.

At the time of consumption, ice cream-type products generally have a temperature of between about 20° F. and about 30° F. As is well known, if ice cream-type products are exposed to temperatures above 32° F. for any length of time, rapid thawing occurs with the result that the whipped foam structure collapses and the aqueous phase separates. The separation of the aqueous phase from any whipped dessert, with or without attendant breakdown or collapse of the foam structure, is generally referred to as syneresis. The degree of syneresis is one measurement of the stability of a whipped dessert under a particular set of physical conditions. Ice cream-type products have essentially no stability against syneresis at room temperature.

The term "whipped topping" includes whipped aqueous fat emulsions which simulate whipped cream. Whipped toppings, as the name implies, are generally intended for use as toppings for pies, cakes, fruit, and the like, and are normally consumed in the thawed state. Whipped topping formulations are generally well known and are disclosed in U.S. Pat. Nos. 2,619,423; 2,913,342; 3,246,942; 3,251,696; and 3,431,117 which are incorporated herein by reference. As may be seen from these prior art patents, whipped toppings formulations may be sold as aqueous emulsions, dry powders, or in the whipped and frozen state. Various modifications in the basic formulations may be made to accomplish desired results, for example, to impart freeze-thaw stability to the whipped topping. Regardless of the formula, however, all whipped toppings have a common property; when they are whipped they provide an aerated foam having desired stiffness and peak-forming characteristics and organoleptic properties generally similar to whipped cream. Recently, whipped toppings have been developed which may be frozen after whipping and thereafter thawed prior to consumption. These whipped toppings, as for example described in U.S. Pat. No. 3,431,117, may be subjected to repeated freezing and thawing cycles and do not exhibit syneresis and/or foam collapse even when held at room temperature for several hours.

Whipped toppings, however, are generally not suitable for consumption in the frozen state due to undesirable organoleptic properties including a greasy mouth feel and poor melt down in the mouth. Frozen whipped toppings are also very hard when maintained at conventional freezer temperatures and are not spoonable in the same fashion as is ice cream.

The present invention provides a multipurpose edible whipped dessert which has ice cream-like characteristics and organoleptic properties when consumed in the frozen state and, in addition, has whipped topping characteristics and organoleptic properties when consumed in the thawed state. Further, the whipped dessert is freeze-thaw stable such that it may be alternately consumed as an ice cream-type product or as a whipped topping and may be refrozen between consumptions. The whipped dessert product is resistant to syneresis and/or foam collapse in the thawed condition and its foam structure is of sufficient strength that while in the thawed state various fruits, flavored syrups, nuts, and the like may be blended into the dessert without destroying or causing collapse of the foam structure. Thereafter, the dessert may be consumed as a topping containing the added materials or may be refrozen and consumed as an ice cream-type product containing the added material.

Very generally, the present invention is directed to an edible whipped dessert comprising the aerated admixture of a topping emulsion and a protein emulsion. The invention further comprises a protein emulsion suitable for admixture with a whipped topping to form a multipurpose whipped dessert and an intermediate unwhipped aqueous mixture of a topping emulsion and a protein emulsion which upon whipping forms a multipurpose whipped dessert and a method of manufacturing such edible whipped desserts which includes admixing a topping emulsion and a protein emulsion under conditions whereby the encapsulation of the fat in the topping emulsion is not disturbed, whipping the mixture at a temperature above the freezing point of the mixture, and thereafter freezing the whipped mixture.

The whipped dessert described herein has physical and organoleptic properties wholly different than previously known whipped desserts. It differs from whipped toppings in that it may be consumed in the frozen state wherein it exhibits the physical and organoleptic properties of ice cream. The whipped dessert differs from ice cream in that in the thawed state it does not exhibit syneresis or foam breakdown upon holding at room temperature for as long as 6 to 8 hours and in the thawed state it exhibits the physical and organoleptic properties of whipped topping. Upon refreezing the whipped dessert, it once again exhibits the physical and organoleptic properties of ice cream. It may readily be seen that the extreme caution normally associated with the handling and dispensing of ice cream is not required with the whipped dessert described herein. It may be further seen that the whipped dessert has unique multipurpose functionality in that it may, at the option of the consumer, be consumed as an ice cream-type dessert or as a whipped topping. This option is reversible and the consumer may consume the thawed whipped dessert as a whipped topping at one time and then refreeze the remaining whipped topping and consume it at a later date as an ice cream-type product.

The present invention contemplates several embodiments of multipurpose whipped desserts: a unitary whipped and aerated frozen dessert prepared by whipped together an aqueous fat emulsion and an aqueous protein emulsion and freezing the aerated mixture; an unwhipped dessert mix in which a fat emulsion, dried or liquid, and a protein emulsion, dried or liquid, are packaged separately or in admixture and sold as a unit to the consumer who reconstitutes the dried emulsions, if necessary, and whips the two emulsions simultaneously in a suitable mixer; and an unwhipped protein emulsion, dry or liquid, which may be reconstituted, if necessary, mixed with a suitable whip topping, for example a thawed frozen whipped topping, and whipped to provide a multipurpose whipped dessert which can be consumed in the thawed state as a whipped topping or which can be frozen and consumed as an ice cream-type product.

The fat emulsion may be any one of a number of known fat emulsions, and may be liquid or dry, and may be whipped or unwhipped, provided that the fat emulsion is formulated so as to provide a whipped topping of particular composition and physical characteristics when the topping emulsion is whipped alone. A fat emulsion that is useful in forming a multipurpose whipped dessert as described herein has the following composition, all percentages herein being percent by weight unless specified otherwise:

|  | Percent |
| --- | --- |
| Fat | 20–40 |
| Protein | 0.5–2 |
| Sweetener | 20–40 |
| Emulsifiers and Stabilizers | 0.3–0.7 |
| Water | balance |
| Total Solids | 40–60 |

The whipped topping formed from the topping emulsion, when whipped alone, should have an overrun of at least about 180 percent, preferably between about 190 percent and about 240 percent, and a foam stiffness of between about 12 RVT units and about 40 RVT units, peferably between about 17 RVT units and about 24 RVT units. As used herein overrun is defined as (weight of unit volume of unwhipped mix ÷ weight of unit volume of whipped topping)−1 × 100. As used herein the foam stiffness measurement is defined as scale unit reading on a Brookfield viscometer equipped with a D-type spindle, run at a rotational speed of 25 r.p.m. at 45° F. with heliopath suspension. (Ambient atmospheric conditions, at altitudes below 1000 feet and above sea level.)

The fat component of the fat emulsion may be any edible triglyceride having desired organoleptic properties when incorporated in the multipurpose whipped dessert. Generally the fat is a hydrogenated vegetable oil, or blend of vegetable oils having a melting point within the range of 91° to 96° F. Suitable vegetable oils include cottonseed oil, soybean oil, corn oil, palm oil, coconut oil, peanut oil, and the like, and the selection of a particular fat to provide a particular organoleptic property is within the skill of the art as set forth in the aforementioned patents.

The protein (component) of the fat emulsion may be any one of the known whippable proteins which also functions as the encapsulating agent for the fat in the fat emulsion. It is understood that in the context of the described multi-purpose dessert the protein must be water-soluble. Suitable water-soluble proteins include sodium caseinate, casein, nonfat dry milk (NFDM), soy proteinates and isolates, and the like. The like selection of the protein encapsulating agent is made to provide a desired overrun and degree of fat churnout, as described hereinafter, in the multipurpose dessert. Generally, sodium caseinate is the preferred protein.

The emulsifier may be any one of a large number of well-known edible compounds suitable for creating a whippable topping emulsion. These emulsifiers are described in the various prior art patents directed to whipped toppings and include propylene glycol monostearate, mono- and diglycerides, lactylated mono- and diglycerides, lactylated propylene glycol monostearate, crystal stabilized monoglycerides such as those described in U.S. Pat. No. 3,453,116, mixtures of emulsifiers such as those sold under the trademark MYVATEX, sorbitan monostearate sold under the trademark SPANS, and polyethylene ethers of sorbitan stearates or oleates sold under the trademark TWEENS. Lecithins may also be employed in combination with these emulsifiers.

Selection of a proper emulsifier for a particular aqueous fat protein system to provide a fat emulsion may be readily acomplished by those skilled in the art depending upon the physical properties desired in the finished whipped topping and the manner in which the topping mix is to be handled prior to whipping. For example, if the aqueous fat emulsion is to be directly mixed with the aqueous protein emulsion and whipped, then mono- and diglycerides and/or SPANS and TWEENS may be preferred. On the other hand, if the fat emulsion is spray dried and subsequently reconstituted and whipped with the protein emulsion, propylene glycol monostearate, and/or lactylated mono- and diglycerides may be preferred.

The level of protein and emulsifier are adjusted relative to one another to provide the desired overrun at the desired degree of fat churnout which, in turn, results in the desired stiffness. Fat churnout is measured in accordance with the procedure described in *Ice Cream Trade Journal*, Vol. 54, No. 5, page 32 (1958). If too much protein is present the fat churnout is insufficient. If too little emulsifier is present the fat churnout occurs before sufficient overrun has developed. Accordingly, the levels of protein and emulsifier, as well as the type of emulsifier are selected to give the desired fat churnout at the point when the desired overrun has been achieved.

A stabilizer such as a natural or synthetic gum is desired in the multipurpose whipped dessert and preferably the multipurpose whipped dessert includes a combination of at least one marine derived gum and at least one vegetable or synthetic gum. The stabilizer may be entirely incorporated in the protein emulsion, as described hereinafter, or a portion of the stabilizer may be incorporated in both the topping emulsion and the protein emulsion. Suitable stabilizers include the marine gums carrageenan and alginates, the vegetable gums guar gum, locust bean gum, gum tragacanth, gum karaya, and the synthetic gums such as methylcellulose, carboxymethylcellulose, and the like. When the multipurpose whipped dessert is made by the addition of a protein emulsion to a commercial whipped topping, for example a frozen whipped topping or a reconstituted dried whip topping, such whipped toppings conventionally include stabilizers, and suitable allowance for their presence may be made in the protein emulsion.

The aqueous protein emulsion that is combined with the topping emulsion to provide a multipurpose whipped dessert has the following composition:

|  | Percent |
| --- | --- |
| Fat | 0–15 |
| Protein | 3–10 |
| Carbohydrate | 20–30 |
| Emulsifiers | 0.05–0.20 |
| Stabilizers | 0.4–0.8 |
| Water | balance |
| Total Solids | 30–40 |

The protein emulsion, when whipped alone to provide an aerated foam, which is referred to herein as a protein puree, has an overrun of at least 150 percent, preferably between about 160 percent and about 180 percent, and a low foam stiffness of at least about 2.5 RVT units, preferably between about 3 RVT units and about 6 RVT units.

The viscosity of the protein emulsion is determined with the No. 5 Zahn type flow cup at 80° F. Flow times between 13–14 seconds are preferred in stirred state prior to gelation. The viscosity after complete gelation, after 24-hour standing, is determined under the same conditions and flow times of 120–160 seconds are preferred.

The fat component if used in the protein emulsion may be any of the triglyceride fats described in connection with the topping emulsion, and, in addition, may be dairy fat. The amount of fat in the protein emulsion is selected to provide a desired level of fat in the multipurpose dessert. If the topping mix contains low levels of fat, it may be necessary to increase the fat content of the protein emulsion.

The protein component of the protein emulsion may be any of the water-soluble proteins discussed in connection with the topping emulsion. However, in a preferred embodiment, all or a major portion of the protein is derived from a milk source, and, more particularly, is derived from fresh cheese curd. The milk protein may be replaced by sodium caseinate or egg albumen. However, from an organoleptic point of view and from a manufacturing point of view, it is generally preferred that a major portion of the protein be derived from a milk source. In this connection, the milk source may be whole milk, skim milk, nonfat dry milk, condensed skim milk, or the like.

The fresh cheese curd may be cream cheese, creamed or uncreamed cottage cheese, or quark, which is defined herein as an acid coagulated milk protein curd recovered by centrifugation. Inasmuch as cottage cheese and quark have a particulate texture as obtained from the cheese-making process, these protein sources are homogenized to a smooth texture before admixture in the protein mix. While each of these fresh cheese curds provides a desirable protein puree, the presence of butterfat in cream cheese is considered preferable because of the improved organoleptic properties of the resulting whipped dessert.

In a preferred embodiment the cream cheese is processed to disrupt the body of the cream cheese before adding to the protein emulsion. This may be accomplished by subjecting the curd to shear as by mixing in a swept wall heat exchanger prior to setting up of the cream cheese in the cheese making process or by subjecting conventionally prepared cream cheese to chopping in a suitable chopper such as a Seydelman meat chopper prior to addition to the protein mix.

The protein emulsion further includes a mixture of stabilizers which includes at least two gums, one of which is from a marine source and one of which is derived from a vegetable source or a synthetic gum. The various gum sources may be specified with respect to the topping emulsion. It has been found that the inclusion of at least two gums, one being from a marine source and one being either a vegetable or synthetic gum, in the stabilizer provides improved freeze-thaw stability to the whipped dessert. A particularly desirable combination of gums is carrageen, alginate, carboxymethylcellulose, and guar gum.

The emulsifier in the protein emulsion may be any one of the emulsifiers described herein in connection with the topping emulsion. In a preferred embodiment, the emulsifier incorporated in the protein emulsion is a sodium stearoyl-2-lactylate and propylene glycol monostearate-glycerol monostearate mixture as described in U.S. Pat. No. 3,453,116 incorporated herein by reference. This emulsifier system has been found to provide desired control of fat churnout in relationship to overrun development when a fat emulsion and a protein emulsion are whipped together. It is contemplated however that other well-known food emulsifiers may be substituted singly or in combination with one another for the emulsifier systems of U.S. Pat. No. 3,453,116.

The whipped dessert is an admixture of a whipped topping from a fat emulsion and a protein puree from a protein emulsion at a ratio of 35:65 to 65:35. The composition of the whipped dessert therefore may have the following ranges:

|  | Weight Ratio of Topping Mix to Protein Mix 35:65 | Weight Ratio of Topping Mix to Protein Mix 65:35 |
| --- | --- | --- |
|  | Percent by Weight | Percent by Weight |
| Fat | 10 – 22 | 14 – 32 |
| Protein | 2 – 7 | 1.5 – 4 |
| Carbohydrates | 20 – 34 | 20 – 37 |
| Stabilizers and Emulsifiers | 0.3 – 0.7 | 0.3 – 0.5 |
| Water | balance | balance |
| Total Solids | 32 – 45 | 36 – 53 |

It has been discovered that the multipurpose functionality of the whipped dessert is optimized at particular ranges of ingredients and when the processing conditions are selected so as to provide particular physical properties. It has been found that the fat content of the whipped dessert should exceed about 10 percent and preferably should be between about 12 percent and about 16 percent. When the fat content is below about 10 percent, there is insufficient fat churnout and multipurpose functionality is impaired. At fat levels above about 16 percent, the fat churnout is excessive and the whipped dessert may have an undesirable coarse texture and exhibit a greasy mouth feel.

The processing conditions, as described hereinafter, are preferably controlled to provide a fat churnout of at least about 10 percent and preferably between about 15 percent and about 30 percent. The particle size of the churned out fat has also been found to be of importance to the texture and peaking characteristics of the whipped dessert when utilized as a whipped topping, and for best results at least about 40 percent of the churned out fat particles have a particle size below about 1.6 microns, preferably about 50 percent of the churned out fat particles having a particle size below about 1.3 microns.

The foam stiffness of the multipurpose dessert at 40° F. is between about 8 and about 25 RVT units, preferably between about 12 and about 18 RVT units. The overrun of the whipped dessert is between about 150 percent and about 250 percent, preferably between about 160 percent and 190 percent.

The combination of the water-soluble whippable protein and the gum stabilizers in the whipped dessert provides the desired stiffness and stability to the whipped foam structure that is necessary to impart multipurpose functionality, freeze-thaw stability, and resistance to syneresis. The protein content of the whipped dessert is generally between about 2.0 percent and about 6.0 percent, preferably between about 2.5 percent and about 5.0 percent. The gum stabilizer content is between about 0.2 percent and about 0.6 percent, preferably between about 0.3 percent and about 0.5 percent.

The whipped dessert may contain other additives such as flavoring ingredients, coloring agents, and the like commonly utilized in whipped toppings and ice cream to impart desired visual and organoleptic effects. The addition of such materials is considered to be within the skill of the art and does not form a part of the present invention.

The multipurpose whipped dessert is prepared by preparing a fat emulsion, separately preparing a protein emulsion, admixing the fat emulsion and the protein emulsion under conditions which insure that the fat emulsion is not broken and the fat particles remain encapsulated by the protein, whipping the admixed fat emulsion and protein emulsion at a temperature which is above the freezing point of the mixture under conditions which provide the desired stiffness, overrun, and fat churnout, and thereafter freezing the aerated foam.

As indicated, the whipped dessert contemplates the use of a fat emulsion of the type generally referred to as a whipped topping, and the fat emulsion may be prepared in accordance with known methods for the manufacture of whipped topping. It is generally desirable to cool the fat emulsion to a low temperature, for example 32° to 45° F., and to hold the fat emulsion at that temperature for a time sufficient to insure that substantially all of the fat is crystallized prior to mixing with the protein emulsion. Holding of the fat emulsion at 35° F. for a period of between about 10 and about 15 hours is generally sufficient to provide substantially complete fat crystallization.

The protein emulsion is prepared by mixing the ingredients together under conditions which will form an aqueous emulsion. When the protein emulsion is prepared utilizing cheese curd as the source of protein, it is generally desirable to separately homogenize the slurry of cheese curd, for example at a pressure of 1000 to 1500 psig in a single-stage homogenizer. The protein homogenizate is then mixed with the remaining ingredients to form the protein emulsion.

It has been found to be essential to carry out the whipping of the mixture of the fat emulsion and the protein emulsion at a temperature which is above the freezing point of the mixture. In conventional ice cream manufacture, the ice cream mix is partially frozen during the whipping step. This is to be avoided in the manufacture of the whipped dessert inasmuch as it has been found that if the whipping is carried out under conditions which cause partial freezing, the resulting product does not have the desired multipurpose functionality.

It has also been found to be desirable to maintain the temperature of the admixture of the fat emulsion and the protein emulsion above the gelation temperature of the gum stabilizers present in the emulsion. If the temperature of the emulsion is lowered to the point where the stabilizer gums commence gelation, the resistance to syneresis is impaired and the freeze-thaw stability of the whipped dessert is reduced. Accordingly, for best results, the admixture of the fatty emulsion and the protein emulsion should be maintained above about 40° F. prior to whipping.

The whipping is controlled to provide a desired overrun and fat churnout. Commercial ice cream mixes have whipping elements called dashers that are designed for whipping protein-fat emulsions in the partially frozen state. It has been found that the whipping characteristics of multipurpose whipped desserts which are whipped unfrozen are sufficiently different from ice cream that a modification of the ice cream freezer dasher is generally desirable in order to provide the desired overrun and fat churnout. One form of modified dasher is described in copending U.S. application Ser. No. 638,291, filed Dec. 8, 1975.

EXAMPLE I

A vanilla flavored multipurpose whipped dessert was prepared with the following compositions for the finished product, fat emulsion, and protein emulsion, all data expressed as percentages by weight of the intermediates or of the finished product:

TABLE I

| | Vanilla Flavored Whipped Dessert 60:40 Protein Emulsion: Fat Emulsion Finished Product Percent | Fat Emulsion Percent | Protein Emulsion Percent |
|---|---|---|---|
| Fortified Skim Milk (1.0% NFMS added and 1.5% condensed skim milk added) | 35.24 | — | 58.75 |
| Water | 19.18 | 47.10 | .57 |
| Soluble Carbohydrates | 21.15 | 20.93 | 21.30 |
| Hydrogenated Coconut Fat (92° F.) | 11.96 | 29.90 | — |

TABLE I-continued

| | Vanilla Flavored Whipped Dessert 60:40 Protein Emulsion: Fat Emulsion Finished Product Percent | Fat Emulsion Percent | Protein Emulsion Percent |
|---|---|---|---|
| Cream Cheese | 8.59 | — | 14.31 |
| Sodium Caseinate | .49 | 1.22 | — |
| Phosphate Salts | .20 | .20 | .20 |
| Polyoxyethylene Sorbitan Monoester, Sorbitan Monostearate, Lecithin Monoglyceride, Propylene Glycol Monostearate, Sodium Stearoyl-2-Lactylate in Water - 10% Solids | .21 | .52 | — |
| | 2.10 | — | 3.50 |
| Gums: a) Sodium Alginate Carboxymethyl Cellulose | .26 | — | .44 |
| b) Calcium Carrageenan Guar Gum | .11 | .07 | .13 |
| Flavorings and Colorings | .51 | .06 | .80 |
| Totals | 100.00 | 100.00 | 100.00 |

The fat emulsion is prepared by melting the fat with the lecithin and fat-soluble coloring in a scraper agitated kettle. The sodium caseinate is added when the batch temperature is 135°–140° F. and the mixture agitated to ensure complete dispersion of the caseinate. The polyoxyethylene sorbitan monoester and sorbitan monostearate emulsifiers are added at 140° F., followed by the addition of hot water (140° F.). The resulting oil-in-water emulsion is further agitated and the temperature raised to 150° F. At this time, a dry blend of the phosphate salts, calcium carrageenan, guar gum, and the soluble carbohydrates is added. After complete dispersion of the dry additives, the emulsion is pasteurized for 20 minutes at 160° F. The flavorings are introduced after the completion of the pasteurization.

The fat emulsion is then homogenized in a two-stage homogenizer at 4500 psig pressure in the first stage and at 500 psig in the second stage and then cooled in a plate cooler to 35°–40° F. The fat emulsion is then held for 5 to 12 hours minimum time at 35°–40° F. to ensure proper fat crystallization. The ratio of crystalline to liquid fat is 80:20. 99.5% of the particles of the emulsion are smaller than 1.28 micron in the finished fat emulsion as determined by a Coulter counter.

The protein emulsion is prepared by heating the fortified skim milk to 120°–125° F. in a jacketed kettle under agitation. At 125° F., a dry blend of the soluble carbohydrates, calcium carrageenan, sodium alginate, carboxymethylcellulose, and guar gum is added to the milk, and, after a proper dispersion is obtained, the phosphate salts are added. After the phosphate salts addition, homogenized cream cheese is dispersed in the heated liquid mixture. The mixture is then pasteurized at 160° F. The protein emulsion is then cooled to 80° F. for the further addition of the hydrated emulsifiers and the flavorings.

After the fat and protein emulsions are prepared, a blend of the two emulsions is prepared in a ratio of 60 parts of protein emulsion to 40 parts of fat emulsion. The resulting temperature of the blend is approximately 60° F. This blend serves as feed for the whipping equipment. The blending tank preferably is equipped with scraper blade agitators which are operated at slow speed to avoid air incorporation. The blend of the emulsions is composed of colloidal particles of which 87.12% are smaller than 1.28 micron.

Batch-wise whipping of the blend of emulsions is effected through use of a planetary mixer using a wire whip. A jacketed mixing bowl was used and slush ice was maintained in the jacket. At a medium speed setting, a whipped product having an overrun of from 150% to 200% was obtained in from 3 to 6 minutes. 37.19% of the colloidal particles are smaller than 1.6 micron.

For commercial production the whipping is carried out in a suitably designed continuous ice cream freezer. The air delivery system, the inlet pump and the outlet pump deliveries are synchronized to 164–180 gallons per hour finished product output with an inlet feed temperature of 63°–64° F. and an outlet temperature of 46°–50° F. Air pressure in the freezer is 24–25.5 psig. An overrun of 170%–175% is achieved and 78.75% of the colloidal particles are smaller than 1.28 micron. The density of the recovered foam is 92–94 grams per 8 fluid ounces which is equivalent to 3.25–3.32 pounds per gallon. The product is packed in suitable containers and frozen at −20° F. for 24 hours. The whipped dessert is then stored at 0° F.

The whipped dessert can be consumed by spooning or scooping in the 0°–10° F. temperature range, in which case it simulates ice cream. It will hold its form without significant liquification and syneresis at room temperature for 4 to 6 hours. If the product is thawed at 35° F., its frozen structure gradually softens to a soft creamy consistency which is similar in texture and peak-forming capability to a whipped topping for use on fruits, cakes, and may be used for various food recipes as is, or refrozen. The storability of the product in thawed state is 7 to 21 days.

Functionally, the whipped dessert differs from ice cream essentially because of its very slow melt down, syneresis-resistance, and refreezability. It differs from the conventional dessert toppings because these products, in the frozen state, are hard and non-spoonable. Its mouth feel, both in the frozen and thawed state is creamy, with none of the greasiness of toppings.

The storability of the product under programmed temperature cycling in the 0°–25° F. range is 3 to 4 weeks without significant ice crystal development. Conventional ice cream under the same conditions develops ice crystals in 4 to 7 days.

EXAMPLE II

A chocolate flavored multipurpose whipped dessert was prepared from a fat emulsion and a protein emulsion based on the use of quark, i.e., a milk protein concentrate obtained by acidification of milk and subsequent centrifugal separation of the protein rich fraction from the milk serum. The composition of the formulation is set forth in parts by weight in the intermediates and in the finished product.

tein. Ice crystal formation was not observed after 6 months storage at 0° F.

TABLE II

| Ingredients | Chocolate Flavored Whipped Dessert | | |
|---|---|---|---|
| | Finished Product | Fat Emulsion | Protein Emulsion |
| Milk Powder | 2.7156 | — | 2.7156 |
| Fortified Skim Milk | 4.5550 | — | 4.5550 |
| Water | 43.4398 | 19.5501 | 23.8897 |
| Soluble Carbohydrates | 19.6438 | 8.6940 | 10.9498 |
| Quark | 12.1450 | — | 12.1450 |
| Hydrogenated Palm Kernel Fat (92° F.) | 12.4200 | 12.4200 | — |
| Sodium Caseinate | 0.5148 | 0.5148 | — |
| Phosphate Salts | 0.1238 | 0.0821 | 0.0417 |
| Polyoxyethylene Sorbitan Monoester | 0.3353 | 0.3353 | — |
| Sorbitan Monostearate Lecithin Monoglyceride, Propylene Glycol Monostearate, Sodium Stearoyl-2-Lactylate in Water - 10 percent solids | 2.0825 | — | 2.0825 |
| Gums: a) Sodium alginate Carboxymethyl cellulose | 0.2582 | — | 0.2582 |
| b) Calcium carrageenan Guar gum | 0.0296 | 0.0296 | — |
| cocoa | 1.6916 | — | 1.6916 |
| Minor flavorings and colorings | 0.0450 | 0.0251 | 0.0199 |
| Totals | 100.0000 | 41.6510 | 58.3490 |

The fat emulsion was prepared the same way as in Example I. The protein emulsion was prepared by reconstituting the skim milk powder in water at room temperature under agitation. A dry blend of the soluble carbohydrates (sucrose), calcium carrageenan, guar gum, and cocoa powder was dispersed in the milk-water combination at 125° F. After proper dispersion, the phosphate salts were added. The quark curd was slurried under vigorous agitation in the liquid fortified skim milk at room temperature in a separate tank. After a smooth dispersion was obtained, the quark dispersion and the carbohydrate, gum, cocoa, milk, phosphate salt containing portion of the formula was blended together for pasteurization and homogenization at 160° F. and 1500 psi pressure. The resulting protein emulsion was cooled to 80° F. for the further addition of the hydrated emulsifiers, flavorings, and coloring. After the fat and protein emulsions were prepared, a blend of these two intermediates was prepared as shown in TABLE II.

Batch-wise whipping of the blend of emulsions was carried out by the use of a Hobart N-50 planetary mixer equipped with a wire whip. A jacketed bowl was used and slush ice was circulated through the jacket to maintain a whipping temperature of 40° F. After 6 minutes whipping at medium speed setting, the product had an overrun of 208 percent and a foam stiffness of 19 RVT units. The contents of the bowl was packaged in suitable containers and frozen at −20° F. for 24 hours. The whipped dessert was then stored at 0° F. The whipped dessert was spoonable at 0° F. and had favorable organoleptic properties similar to chocolate ice cream. The dessert held its form when discharged from its container without liquification and syneresis at room temperature for 6 hours. In the thawed condition, in the temperature range of 35° to 45° F., the whipped dessert has organoleptic and peak-forming characteristics similar to whipped cream. In this state it can be used as a decorating topping for cakes. The product is refreezable several times without deformation or syneresis. On analysis its composition was found to contain 42 percent total solids, 14 percent fat, and 3.84 percent protein. Ice crystal formation was not observed after 6 months storage at 0° F.

EXAMPLE III

A series of vanilla flavored multipurpose desserts were prepared by blending and whipping a protein emulsion, as described in Example I, with various commercially available whip toppings, which served as the fat emulsion components of the multipurpose dessert. The whip toppings were selected to represent the various types generally used in the food industry and included (a) aqueous, unwhipped, pasteurized and frozen whip topping; (b) aqueous unwhipped, sterilized and canned whipped topping; (c) prewhipped, pasteurized and frozen whipped topping; and (d) spray dried, pasteurized whipped topping. These fat emulsions were thawed or reconstituted and readied for whipping following use directions indicated on product labelling, with the exception of sample type (c) which after thawing was in a whipped state. The fat content of each whipped topping was determined, and aliquots of each whip topping representing equal amounts of fat were then blended with aliquots of the protein emulsion in ratios such that the resulting blends had approximately the same fat content as the multipurpose dessert described in Example I. Five hundred gram portions of the resulting blends having equal fat content were whipped in the jacketed bowl of an N-50 type Hobard laboratory blender using a wire whip for six minutes at 40° F at speed No. 2. The temperature was controlled by pumping an ice-water slurry through the mixing bowl jacket. The mixing time was controlled by an automatic timer. After the whipping was completed the overrun and foam stiffness of the resulting whipped, multipurpose dessert was determined using a volume aliquot of 8 fluid ounces of each product. The rest of the whipped multipurpose dessert was packaged into tapered plastic containers of equal sizes and shapes, each containing about 250 milliliter of the whipped product. The top surface of the foam was leveled with a knife, lids were inserted on the containers, and the products were frozen at −20° F for 24 hours. The containers were stored at 0° F for several days. Samples of each type whipped topping were prepared and frozen in the same manner.

Comparative evaluation of the samples as to spooning form holding and syneresis were made as in Example I. For this purpose the samples were removed from the inverted containers by means of a gentle pressure. The free standing frozen dessert units were kept at room temperature without mechanical disturbance under observation for as long as seven hours. Organoleptic and spooning tests were conducted on a similarly treated set of identical samples. It was found that the multipurpose dessert products made with the various commercial toppings and the protein emulsion of Example I had essentially the same characteristics as the multipurpose dessert product of Example I, whereas the topping products were not spoonable at 0° F and their organoleptic appeal was not similar to that of ice cream. The observations are summarized in the following table.

TABLE IV

| Ingredients | Modified High-Protein Emulsion Parts by Weight |
|---|---|
| Sucrose (contains 0.416 of a vitamin-mineral mix) | 8.694 |
| Corn syrup solids, 42 D.E. | 1.546 |
| Sodium Alginate | .198 |
| Carboxymethyl Cellulose | .058 |
| Water | .333 |
| $Na_2HPO_4$ | .111 |
| Fortified Skim Milk with 1.5 percent NFDM added | 25.972 |
| Carrageenan | .025 |
| Guar Gum | .012 |
| Water | 1.838 |
| Propylene Glycol Monostearate-Glycol Monostearate | .163 |
| Sodium Stearoyl-2-Lactylate | .041 |
| Vanilla | .078 |
| Sugared Egg Yolk | .393 |
| Dry Egg Whites | 2.188 |
| Cottage Cheese | 8.350 |
| Cream Cheese | 4.175 |
| Fortified Skim Milk | 3.340 |
| Condensed Skim Milk | .835 |
| Total | 58.350 |

TABLE III

Comparative properties of multipurpose whipped desserts made with various fat emulsions and the protein emulsion of Example I.

| Test Sample Composition | | Total Fat Content % | Over-run % | Foam Stiffness RVT Scale Units |
|---|---|---|---|---|
| Fat Emulsion Used | Protein Emulsion Used | | | |
| Type (a) distributed frozen | Example I | 15.1 | 224 | 15 |
| | none | 23.0 | 264 | 20 |
| Type (b) distributed in cans | Example I | 15.3 | 208 | 11.5 |
| | none | 25.0 | 253 | 14.5 |
| Type (c) distributed prewhipped, frozen | Example I | 15.8 | 210 | 12.5 |
| | none | 29.2 | 220 | 14 |
| Type (d) distributed in any form | Example I | 15.1 | 171 | 7.5 |
| | none | 19.0 | 171 | 8 |
| Example I | Example I | 15.8 | 175 | 13.0 |
| | none | 29.9 | 190 | 20 |
| None | Example I | 3.3 | 160 | 2.5 |

Melt down observations on room temperature storage of free standing samples, after discharge in hours

| 0 | 3 | 7 |
|---|---|---|
| spoonable | no liquification 20% sag | no liquification 30% sag |
| too hard to spoon | no deformation no syneresis | no liquification 20% sag |
| spoonable | no liquification 75% sag | no liquification 80% sag |
| too hard to spoon | no deformation no syneresis | no liquification 20% sag |
| spoonable | no liquification 20% sag | no liquification 30% sag |
| too hard to spoon | no deformation no syneresis | no deformation no liquification |
| spoonable | 25% sag | no observation |
| too hard to spoon | deformation, shrinkage, syneresis | foam collapse, syneresis |
| spoonable | no liquification, no deformation, no sag | no liquification 20% sag |
| too hard to spoon | no deformation no syneresis | no liquification no sag |
| not spoonable | all melted (liquified) | all melted (liquified) |

EXAMPLE IV

The protein content of the multipurpose whipped dessert was increased to 5 percent and its nutritive value increased by addition of vitamins and trace minerals.

The fat emulsion portion of the multipurpose dessert was as in Example I. The nutrient fortification was achieved by modifying the composition and processing of the protein emulsion. The composition of the protein emulsion is illustrated in the following table in parts by weight:

41.65 parts of the fat emulsion and 58.35 parts of the fortified protein emulsion form the multipurpose dessert. The vitamin-mineral nutrient mix added in dry blend with the sucrose ingredient had the following composition, based upon percent by weight in the multipurpose dessert.

| Composition of Vitamin-Mineral Nutrient Mix | |
|---|---|
| Vitamin Mix | |
| Vitamin C (Ascorbic Acid) | .014097 |
| Vitamin E Acetate | .010573 |
| Pantothenyl Alcohol | .006048 |
| Nicotinic Acid (Niacin) | .002590 |
| Vitamin $B_{12}$ | .000661 |
| Pyridoxine HCl (Vitamin $B_6$) | .000286 |
| Thiamine HCl | .000282 |
| Vitamin $D_2$ | .000211 |
| Riboflavin | .000128 |
| Folic Acid | .000048 |
| Biotin | .000040 |
| Total | .034964 |
| Mineral Mix | |
| Magnesium Carbonate | .155285 |
| Di-Calcium Phosphate 2 $H_2O$ | .143774 |
| Calcium Carbonate | .067320 |
| Ferric Ammonium Citrate | .011428 |
| Zinc Carbonate | .003051 |
| Cupric Carbonate | .000413 |
| Total | .381271 |
| Total Nutrient Mix added to Sucrose (in weight units) | .416 |

The cream cheese, cottage cheese, and fortified skim milk-condensed skim milk components of the formula were processed in a Seydelmann cutter by incremental addition and gradual chopping until a smooth textured, uniform slurry was obtained. This blend "protein homogenizate" was then homogenized at 1000–1500 psi pressure and held until the rest of the protein emulsion components were processed.

Fortified skim milk was added to a 100-gallon INA Groen Kettle, and heated to 130°–135° F. with jacket heating (160° F.) and agitation. Using a powder funnel with high shear centrifugal pump recirculation, dry mixtures of sucrose-egg white and sucrose, corn syrup solids and NFDM and sucrose-gum mixtures were mixed into the heated milk solution with continuous agitation. Recirculation was continued to allow good dispersion. The temperature of the batch was maintained at 124°–130° F. A water solution of di-sodium phosphate ($Na_2HPO_4$) was added and mixed. Then the egg yolks were mixed in increments with buckets of the batch mixture by hand agitation, and added back to the batch mixture. After thorough mixing the prepared "protein homogenizate" was added slowly to the batch mixture in increments and allowed to thoroughly disperse. The batch was then heated to 145° F. and held for 30-minute pasteurization. After pasteurization, the vitamin-mineral mixture blended with sucrose was added slowly to the batch. The hydrated emulsifiers consisting of propylene glycol monostearate, glycerol monostearate, and sodium stearoyl-1-lactylate were added at 80° F. with good agitation and allowed to mix thoroughly.

The protein emulsion thus completed was blended with the fat emulsion in the ratio indicated above for whipping. An M-10 Creamery Package continuous freezer was operated in similar fashion as shown in Example I using a modified dasher as disclosed in co-pending U.S. application Ser. No. and a rate of 164 gallons/hr. (11 sec./½ gallon). The inlet and outlet variable pumps were set to deliver the desired rate in combination with the air supply to maintain 175 percent to 180 percent overrun conditions. The Brookfield RVT foam stiffness was maintained at 13.5. Whipped product at 47°–48° F. was collected in plastic quart containers and frozen at −20° F. for evaluation.

Product quality evaluations were made on the frozen samples in terms of room temperature melt-down, freeze-thaw stability, and refrigerated storage. Freeze-thaw stability was considered acceptable, room temperature melt-down studies were considered acceptable (inverted product intact with no syneresis after 4 hours standing, at 5 hours slight spread and very slight syneresis) and at refrigerated storage conditions, the texture was considered acceptable with no syneresis up to 7 days storage. The organoleptic quality was considered satisfactory.

The composition of the finished dessert mix was found to contain 42.7 percent solids, 5.03 percent protein, and 14.7 percent fat. The finished product was assayed for vitamins after 3-months storage. It was found that except for vitamin C, all vitamins were preserved in the dessert.

The embodiments of the invention in which an exclusive property or privilege is claimed are defined as follows:

1. An aerated frozen dessert, comprising an aerated frozen foam formed by combining an aqueous fat emulsion and an aqueous protein emulsion, to provide a mixture having the aqueous fat emulsion and the aqueous protein emulsion present in the ratio of from about 65:35 to about 35:65 of the aqueous fat emulsion to the aqueous protein emulsion, whipping the mixture above the freezing point of the mixture and subsequently freezing the whipped mixture to provide the aerated frozen dessert, said dessert including between about 10 and about 32 percent by weight edible fat, between about 1.5 and about 7 percent by weight water soluble whippable protein, sweeteners, emulsifiers and gum stabilizers, said dessert having a fat churn out of between about 10 percent and about 30 percent, said dessert having an overrun between about 150 and 250 percent, said dessert, when frozen, being spoonable and having organoleptic properties similar to ice cream, said dessert, when thawed, having organoleptic properties of whipped topping, and being resistant to syneresis when held at room temperature for 6 hours, said dessert being freeze-thaw stable.

2. An aerated frozen dessert in accordance with claim 1 wherein the edible fat content of the frozen dessert is between about 12 and about 16 percent by weight.

3. An aerated frozen dessert in accordance with claim 2 wherein the overrun is between about 160 and about 190 percent.

4. An aerated frozen dessert in accordance with claim 1 wherein at least about 10 percent of the edible fat is in the form of churned out fat particles, at least about 40 percent of said churned out fat particles having a particle less than about 1.6 microns.

5. An aerated frozen dessert in accordance with claim 1 wherein between about 15 and about 30 percent of the edible fat is in the form of churned out fat particles, at least about 50 percent of said churned out fat particles having a particle size of less than about 1.3 microns.

6. An aerated frozen dessert in accordance with claim 1 having a foam stiffness at 40° F of between about 8 and about 25 RVT units.

7. An aerated frozen dessert in accordance with claim 1 having a foam stiffness at 40° F of between about 12 and about 18 RVT units.

8. An aerated frozen dessert in accordance with claim 1 wherein the protein emulsion comprises between 0 and about 15 percent by weight edible fat, between about 3 and about 10 percent by weight water soluble whippable protein, emulsifiers and gum stabilizers.

9. An aerated frozen dessert in accordance with claim 8 wherein the protein emulsion, when whipped alone, has an overrun of between about 150 percent and about 180 percent and a foam stiffness at 40° F of between about 2.5 and about 6 RVT units.

10. An aerated frozen dessert in accordance with claim 8 wherein the gum stabilizers comprise a mixture of at least one marine gum and at least one gum selected from vegetable gums and synthetic gums.

11. An aerated frozen dessert in accordance with claim 8 wherein the fat emulsion comprises between about 20 and about 40 percent by weight edible fat, between about 0.5 and about 2 percent by weight of a water soluble whippable protein, edible emulsifiers and stabilizers, said fat emulsion, when whipped alone having an overrun greater than about 180 percent and a foam stiffness at 40° F of between about 12 and about 40 RVT units.

12. An aerated frozen dessert in accordance with claim 11 wherein the fat emulsion, when whipped alone, having an overrun of between about 190 and about 240 percent and a foam stiffness at 40° F of between about 17 and about 25 RVT units.

13. A method for the manufacture of a frozen aerated dessert, having the organoleptic properties of ice cream when consumed in the frozen state and the organoleptic properties of whipped topping when consumed in the thawed state comprising providing an aqueous fat emulsion including edible fat, water soluble whippable protein, and an edible emulsifier, providing an aqueous protein emulsion including water soluble whippable protein, and an edible emulsifier, admixing said topping emulsion and said protein emulsion, in the ratio of from about 65:35 to about 35:65 of said topping emulsion to said protein emulsion to provide a mixture including between about 10 and about 32 percent by weight edible fat and between about 1.5 and about 7 percent water soluble whippable protein, whipping said admixture above the freezing point of said admixture, controlling the condition of said whipping to provide an aerated unfrozen foam having an overrun of between about 150 percent and about 250 percent, and a fat churnout of between about 10 percent and about 30 percent and thereafter freezing said foam.

14. A method in accordance with claim 13 wherein the whipping is effected continuously and the residence time and air pressure within the whipping unit is controlled to provide between about 15 and about 30 percent churned out fat particles, at least 40 percent of said churned out fat particles having a particle size below about 1.6 microns, an overrun of between about 160 and 190 percent and a foam stiffness at 40° F of between about 8 and about 25 RVT units.

15. An aerated frozen dessert comprising an aerated frozen foam formed by combining an aqueous fat emulsion and an aqueous protein emulsion to provide a mixture containing said fat emulsion and said protein emulsion in the ratio of from about 65:35 to about 35:65 of said fat emulsion to said protein emulsion, whipping said mixture above the freezing point of the mixture and subsequently freezing the whipped mixture to provide said aerated frozen dessert, said dessert including between about 10 and about 16 percent by weight edible fat, between about 2 and about 6 percent by weight water soluble, whippable protein, sweeteners, emulsifiers and gum stabilizers, said protein emulsion comprising between 0 and about 15% by weight edible fat, between about 3 and about 10 percent by weight water soluble whippable protein, emulsifiers and gum stabilizers, said fat emulsion comprising between about 20 and about 40 percent by weight edible fat, between about 0.5 and about 2 percent by weight of a water soluble whippable protein, edible emulsifiers and stabilizers, said fat emulsion, when whipped alone having an overrun greater than about 180% and a foam stiffness at 40° F of between about 12 and about 40 RVT units, said dessert having a fat churnout of between about 10 percent and about 30 percent, said dessert having an overrun between about 150 and 250 percent, said dessert, when frozen, being spoonable and having organoleptic properties similar to ice cream, said dessert, when thawed, having organoleptic properties of whipped topping and being resistant to syneresis when held at room temperature for 6 hours, said dessert being freeze-thaw stable.

16. An aerated frozen dessert in accordance with claim 15 wherein the fat emulsion, when whipped alone, has an overrun of between about 190 and about 240 percent and a foam stiffness at 40° F of between about 17 and about 25 RVT units.

17. A method in accordance with claim 15 wherein the whipping is effected continuously and the residence time and air pressure within the whipping unit is controlled to provide between about 15 and about 30 percent churned out fat particles, at least 40 percent of said churned out fat particles having a particle size below about 1.6 microns, an overrun of between about 160 and 190 percent and a foam stiffness at 40° F of between about 8 and about 25 RVT units.

18. A method for the manufacture of a frozen aerated dessert having the organoleptic properties of ice cream when consumed in the frozen state and the organoleptic properties of whipped topping when consumed in the thawed state comprising the steps of forming a mixture including about 20 to about 40 percent by weight edible fat, between about 0.5 and about 2 percent by weight of a water soluble whippable protein, edible emulsifiers and stabilizers, pasteurizing said mixture and homogenizing said mixture to form a fat emulsion, holding said fat emulsion at a temperature of between about 35°–40° F for a time sufficient to insure fat crystallization, said fat emulsion, when whipped alone, having an overrun greater than about 180 percent and a foam stiffness at 40° F of between about 12 and about 40 RVT units, forming a mixture including between 0 and about 15 percent by weight edible fat, between about 3 and about 10 percent by weight water soluble, whippable protein, emulsifiers and gum stabilizers, pasteurizing said mixture to provide a protein emulsion, admixing said fat emulsion and said protein emulsion at a ratio of from about 65:35 to about 35:65 of said fat emulsion to said protein emulsion to provide a mixture including between about 10 and about 16 percent by weight edible fat and between about 2 and about 6 percent water soluble, whippable protein, whipping said admixture above the freezing point of said admixture, controlling the condition of said whipping to provide an aerated unfrozen foam having an overrun of between about 150 percent and about 250 percent, and a fat churnout of between about 10 percent and about 30 percent and thereafter freezing said foam.

* * * * *

UNITED STATES PATENT AND TRADEMARK OFFICE
CERTIFICATE OF CORRECTION

PATENT NO. : 4,012,533
DATED : March 15, 1977
INVENTOR(S) : John J. Jonas

It is certified that error appears in the above-identified patent and that said Letters Patent are hereby corrected as shown below:

Column 3, line 55, reads "24RVT", should read -- 25 RVT --. Column 4, line 8, reads "(component)", should read -- component --; Column 4, line 15, reads "The like selection:, should read -- The selection --; Column 4, line 31, reads "polyethylene", should read -- polyoxyethylene --; Column 4, line 37, reads "acomplished", should read -- accomplished --. Column 11 - TABLE II, the parenthesis under the "Ingredients" column are omitted; Column 11, line 53, reads "208percent", should read -- 208 percent --. Column 15, line 41, reads "124°", should read -- 125° --; Column 15, line 53 reads "stearoyl-1-lactylate", should read -- stearoyl-2-lactylate --.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*